United States Patent Office 3,032,548
Patented May 1, 1962

3,032,548
METHODS OF TREATING CELLULOSE
Elof Ingvar Jullander, Ornskoldsvik, Sweden, assignor to Mo Och Domsjö Aktiebolag, Ornskoldsvik, Sweden, a corporation of Sweden
No Drawing. Filed Feb. 2, 1959, Ser. No. 790,365
Claims priority, application Sweden Feb. 10, 1958
4 Claims. (Cl. 260—212)

The present invention relates to a method of treating cellulose with alkali metal borohydrides. The main object of the invention is to improve the effect of the treatment with borohydrides.

It is well-known that by reducing cellulose with borohydrides it is possible to achieve certain advantageous effects, such as a decreased brightness reversion on heating and a reduction of the solubility in hot alkalies as well as a slightly increased viscosity. The accepted explanation is that the number of carbonyl groups in the cellulose is decreased by reduction thereof to form hydroxyl groups. This explanation is confirmed by the fact that the reducing activity of the cellulose, as measured by a determination of the copper number, is decreased. A reduced brightness reversion is particularly desirable in cellulose pulp intended to be used for paper manufacture as well as in cellulose pulp to be used as a filler in plastic materials. A lower solubility in hot alkalies is particularly desirable in pulp (so-called dissolving pulp) which is to be used for the preparation of viscose rayon and cellulose derivatives such as cellulose esters and ethers.

Treatment with borohydrides has hitherto been carried out with the cellulose suspended in water, the cellulose concentration being a few percent. The amount of borohydride which has to be used, depending on the nature of the cellulose and the desired effect, may vary between 0.01 and 20% by weight of the cellulose. Since borohydrides, however, are expensive chemicals it is desirable to reduce the amount of borohydride which has to be used to achieve a desired effect, or in other words, to utilize the borohydride in a better way.

It was found that this result can be achieved by keeping the ratio of cellulose to water during the reaction as high as possible. In accordance with this invention, this ratio is maintained at least at 0.1:1 and preferably within the range from 0.25:1 to 2:1. Surprisingly it was found that a given amount of borohydride provides a substantially greater improvement of the stability of the cellulose as the amount of water present is reduced.

The process of this invention may be carried out in various ways. The cellulose and the borohydride are brought together in any suitable manner, the latter preferably dissolved in water, or if desired in a minor amount of a water-miscible organic solvent for the borohydride, such as dioxan, methanol, ethanol, isopropanol or tetrahydrofuran. For example, the cellulose may be slurried in an aqueous solution of the borohydride, whereupon excess solvent can be removed by centrifuging filtration, squeezing e.g. in a screw press or in any other manner. The excess aqueous solution of borohydride may, if desired, be recycled for treatment of another batch of cellulose.

The cellulose, if desired moistened, and an aqueous solution of the borohydride can be contacted in a mixing apparatus and be agitated together therein, either in a discontinuously operating apparatus, e.g. a Werner-Pfleiderer type apparatus, or a continuously operating apparatus, e.g. a so-called mixer of the type commonly employed in continuous cellulose bleaching plants.

With high ratios of cellulose to water it may be more convenient and in some cases even necessary to spray a solution of the borohydride on the cellulose, which may be in the form of a sheet or be present as a powder or the like.

In the reaction of the borohydride and the cellulose and in the unavoidable side-reaction between the borohydride and the water, a borate will be formed. Depending on the amount of borohydride added and on other circumstances, such as the ultimate use of the cellulose pulp, it may be either suitable or unnecessary after completed reaction to remove the borate wholly or in part by washing with water.

The reaction is preferably carried out at a temperature of between room temperature and 100° C., preferably at 35 to 70° C. However, the temperature is not critical and higher or lower temperatures may be employed if desirable. In particular in the case of such methods of treatment where the aqueous solution of borohydride is not washed out, but allowed to remain in the cellulose, so that a practically unlimited time of reaction is available, the temperature may, of course, be arbitrarily low.

The term "alkali metal borohydride" as used herein includes the borohydrides of lithium, sodium, potassium, rubidium and caesium. For economical reasons, however, probably only sodium and potassium borohydride will be used in practice.

In accordance with this invention, the amount of borohydride will preferably be within the range of 0.01 to 1% by weight based on the cellulose.

It is possible to add certain salts which enhance the action of the borohydride, e.g. water-soluble salts of lithium, calcium, magnesium, strontium and barium, although the effect of said salts in the present case will be more marked only at comparatively low concentrations of cellulose, i.e. within the lower part of the range of cellulose concentrations set forth herein. As disclosed in U.S. patent application Serial No. 691,165, filed on October 21, 1957 (E. I. Jullander), and issued on August 4, 1959, as United States Patent 2,898,333, of which the present application is a continuation-in-part, the amount of such salt is generally kept within the range of 0.1 to 10% based on the weight of cellulose.

As cellulose to be treated in accordance with this invention all types of cellulose may be used, such as chemical cellulose prepared by the sulfite or sulfate method or other methods from hardwood, softwood, straw or other vegetable raw materials, and further cotton, cotton linters or the like. Various types of modified cellulose can also be treated in accordance with this invention, e.g. so-called hydrocellulose or oxycellulose obtained by treating cellulose with strong acids and oxidizing agents, respectively, and furthermore cellulose regenerated from cellulose derivatives (xanthate, acetate, nitrate). The term "cellulose" as used herein includes what is commonly called cellulose pulp, which apart from cellulose contains greater or lesser amounts of closely related substances, which are usually collectively called hemicellulose, e.g. xylan, mannan.

The invention is illustrated by the following examples. In these examples, all percentages are by weight.

EXAMPLE 1

20 grams of sulfite cellulose were disintegrated in water and formed into a cake of about 1 cm. thickness on a Büchner funnel. After drying in an oven, the cake was soaked in a sufficient quantity of aqueous sodium borohydride (50° C.) to give a cellulose/water ratio of 0.25:1. Thereupon the cellulose cake was kneaded with a glass rod and kept for 3 hours at 50° C. without agitation. Thereupon it was washed with water, acidified with dilute acetic acid, washed with water again and dried, whereupon its copper number was determined. In three experiments, the borohydride solutions contained such a proportion of borohydride that 0.1, 1.0 and 2.0% of borohydride was supplied to the cellulose, based on the cellulose. The results are tabulated below.

For comparison, a series of experiments was conducted in which the ratio of cellulose to water was kept at 0.02:1 (2% cellulose concentration in aqueous slurry). In these experiments, 20 g. of cellulose were slurred in 980 g. of water in which the requisite amount of sodium borohydride was dissolved to provide 0.5, 1.0, 3.0, 5.0 and 10.0% of borohydride based on the cellulose. The slurry was kept at 50° C. for 3 hours with agitation. Thereupon the cellulose was drained and washed as described above and dried, whereupon its copper number was determined. The results are tabulated below. The initial copper number of the starting cellulose was 1.6.

*Table I*

| Ratio, cellulose/water | NaBH₄, percent | Cu number, g. per 100 g. acc. to Braidy |
| --- | --- | --- |
| 0.02:1 | 0.5 | 1.5 |
| 0.02:1 | 1.0 | 1.3 |
| 0.02:1 | 3.0 | 0.4 |
| 0.02:1 | 5.0 | 0.2 |
| 0.02:1 | 10.0 | 0.1 |
| 0.25:1 | 0.1 | 1.5 |
| 0.25:1 | 1.0 | 0.3 |
| 0.25:1 | 2.0 | 0.1 |

EXAMPLE 2

Sulfite pulp in sheet form was sprayed with a solution of sodium borohydride. The spraying was made with a spray gun and both faces of the sheet were treated. The sheet was weighed before spraying, and spraying was discontinued when the increase in weight was obtained which corresponded to the desired cellulose/water ratio. The amount of borohydride in the solution was chosen so that the cellulose received the intended quantity thereof. After spraying the sheets were torn manually into pieces and placed in a plastic bag and stored in an oven at 50° C. for 3 hours. Thereupon they were washed and dried in the manner described in Example 1. The copper numbers of the treated cellulose samples are set forth in Table II. The copper number of the initial cellulose was 1.6.

*Table II*

| Ratio, cellulose/water | NaBH₄, percent | Cu number, g. per 100 g. acc. to Braidy |
| --- | --- | --- |
| 1:1 | 0.1 | 1.5 |
| 1:1 | 0.2 | 1.1 |
| 1:1 | 0.3 | 0.7 |
| 1:1 | 0.5 | 0.3 |
| 1:1 | 0.7 | 0.1 |
| 1:1 | 1.0 | 0.1 |
| 1.5:1 | 1.0 | 0.2 |
| 2.3:1 | 1.0 | 0.2 |

EXAMPLE 3

Sulfate pulp having a copper number of 1.0 was treated with sodium borohydride in varying amounts in the same manner as in Example 2, the ratio of cellulose to water being kept at 1:1. For comparison, a series of experiments was carried out where the ratio of cellulose to water was kept at 0.02:1. This series of experiments was conducted in the manner described in Example 1. The results are indicated in Table III below.

*Table III*

| Ratio, cellulose/water | NaBH₄, percent | Cu number, g. per 100 g. acc. to Braidy |
| --- | --- | --- |
| 1:1 | 0.1 | 0.9 |
| 1:1 | 0.2 | 0.7 |
| 1:1 | 0.5 | 0.2 |
| 1:1 | 1.0 | 0.1 |
| 0.02:1 | 0.1 | 0.9 |
| 0.02:1 | 0.2 | 0.9 |
| 0.02:1 | 0.5 | 0.7 |
| 0.02:1 | 1.0 | 0.6 |

I claim:
1. In a method of improving cellulose which comprises reacting cellulose suspended in an aqueous medium with an alkali metal borohydride, the improvement which comprises diminishing the amount of borohydride required to produce a desired reduction in the copper number of said cellulose by maintaining a ratio of cellulose to water which is at least 0.25 to 1 by weight whereby treatment of the cellulose to produce a cellulose having a copper number which has been lowered to the desired extent is effected with amounts of borohydride less than 1% by weight, which amounts are substantially less than the amounts of borohydride required to produce the same diminution in copper number of an otherwise identical suspension of cellulose wherein the ratio of cellulose to water is less than 0.25 to 1.

2. The method of claim 1 in which the ratio of cellulose to water is within the range of 0.25:1 to 2:1 by weight.

3. The method of claim 1 in which the amount of alkali metal borohydride is 0.01 to 1% by weight based on the cellulose.

4. The method of claim 1 in which said alkali metal borohydride is selected from the group consisting of sodium borohydride and potassium borohydride.

References Cited in the file of this patent
UNITED STATES PATENTS

| | | |
| --- | --- | --- |
| 2,687,943 | Pete | Aug. 31, 1954 |
| 2,730,426 | Becker et al. | Jan. 10, 1956 |
| 2,805,118 | Lawrence et al. | Sept. 3, 1957 |
| 2,898,333 | Jullander | Aug. 4, 1959 |